United States Patent
Player et al.

(10) Patent No.: US 10,447,753 B2
(45) Date of Patent: Oct. 15, 2019

(54) ENCODING SCALABILITY WITH BROKERS

(71) Applicant: Verizon Digital Media Services Inc., Dulles, VA (US)

(72) Inventors: Grady Player, Riverton, UT (US); Calvin Ryan Owen, Draper, UT (US); David Frederick Brueck, Saratoga Springs, UT (US)

(73) Assignee: Verizon Digital Media Services Inc., Dulles, VA (US)

(*) Notice: Subject to any disclaimer, the term of this patent is extended or adjusted under 35 U.S.C. 154(b) by 318 days.

(21) Appl. No.: 15/292,419

(22) Filed: Oct. 13, 2016

(65) Prior Publication Data

US 2018/0109583 A1  Apr. 19, 2018

(51) Int. Cl.
*H04L 29/06* (2006.01)
*H04L 29/08* (2006.01)
*H04L 12/24* (2006.01)
*H04L 12/26* (2006.01)

(52) U.S. Cl.
CPC ........ *H04L 65/607* (2013.01); *H04L 41/0896* (2013.01); *H04L 41/5025* (2013.01); *H04L 65/601* (2013.01); *H04L 67/2809* (2013.01); *H04L 41/509* (2013.01); *H04L 43/0817* (2013.01)

(58) Field of Classification Search
CPC ............... H04L 65/607; H04L 41/0896; H04L 41/5025; H04L 67/2809; H04L 65/601; H04L 43/0817; H04L 41/509
See application file for complete search history.

(56) References Cited

U.S. PATENT DOCUMENTS

| | | | |
|---|---|---|---|
| 6,873,877 B1* | 3/2005 | Tobias | H04L 29/06 375/E7.016 |
| 2011/0317763 A1* | 12/2011 | Takada | H04N 19/395 19/423 |
| 2014/0215536 A1* | 7/2014 | Maxwell | H04N 21/47202 725/87 |
| 2014/0247885 A1* | 9/2014 | Brueck | H04L 65/605 375/240.24 |
| 2015/0106813 A1* | 4/2015 | Mihalocivi | H04L 47/125 718/1 |
| 2015/0269633 A1* | 9/2015 | Mahadevan | G06Q 30/0275 705/71 |
| 2015/0350704 A1* | 12/2015 | Horen | G06F 16/40 725/95 |
| 2017/0078687 A1* | 3/2017 | Coward | H04N 19/395 |

* cited by examiner

*Primary Examiner* — Michael A Keller
(74) *Attorney, Agent, or Firm* — Ansari Katiraei LLP; Arman Katiraei; Sadiq Ansari (57) ABSTRACT

A scalable architecture is provided for decentralized scaling of resources in a media content encoding platform. The scalable architecture is comprised of a first slicing tier, a second broker tier, and a third encoding tier. Each tier can be horizontally and vertically scaled independent of one another. The second broker tier receives media content slices from the first slicing tier. The second broker tier retains the slices directly in main memory of different brokers without writing the slices to a database or disk. The brokers distribute the slices from main memory across the third encoding tier for encoding based on availability of different encoders in the third tier. This architecture improves overall encoding performance as some of the delays associated with managing and distributing the slices at the second tier are eliminated by operation of the brokers.

9 Claims, 10 Drawing Sheets

ENCODING SCALABILITY WITH BROKERS

BACKGROUND ART

Media content delivery continues shifting from traditional broadcast distribution to online or over-the-top (OTT) distribution. Online or OTT distribution relies on digital networks to provide live, linear, or on-demand streams to different digital devices.

This shift has increased the demand on the digital networks. More and more bandwidth is consumed as content consumers shift to online or OTT distribution. The increased network demand also stems from growing media content size due to increased quality (e.g., 4K) and features (e.g., High Dynamic Range, wider spatial sound, etc).

The increased availability of media content online and the higher quality delivery of that content have also increased demand on cloud based encoding platforms, especially as media content providers move away from deploying and managing local encoding hardware resources to instead use the much more cost effective, reliable, and faster performing shared encoding resources of a cloud based encoding platform. Media content providers can focus on media content creation while the third-party cloud based encoding platform focuses on deploying, managing, maintaining, upgrading, and allocating the resources to different media content providers in an optimal manner that maximizes resource usage. In particular, the cloud based encoding platform allocates encoding resources to different media content providers as needed, thereby maximizing overall resource usage with lower overall cost.

An effective cloud based encoding platform is one that can dynamically and quickly scale its resources as demand and usage increases beyond a current resource allocation. Accordingly, there is a need to provide a cloud based encoding platform with a scalable architecture. More specifically, there is a need to scale the resources in a seamless manner, whereby additional resources can be introduced as part of the platform with minimal affect or change to the existing resources.

BRIEF DESCRIPTION OF THE DRAWINGS

A preferred embodiment of methods and systems for a scalable cloud based media encoding platform will now be described, by way of example only, with reference to the accompanying drawings in which.

DETAILED DESCRIPTION

To aid in the discussion that follows, media content refers to digital content with a temporal duration. Media content can include video, audio, a sequence of text, a sequence of images, a service, or any combination thereof. Media content can be composed of multiple media elements. For instance, media content can be formed with primary video content that is broken up and separated by breaks during which advertisements or other third party content is presented.

The embodiments are directed to a scalable architecture for decentralized scaling of resources in a media content encoding platform. The scalable architecture partitions the platform into different scalable tiers that can be horizontally and vertically scaled independent of one another. The scaling of resources occurs with minimal configuration change to the platform and without interrupting ongoing media encoding activities of the platform.

Figure 1:
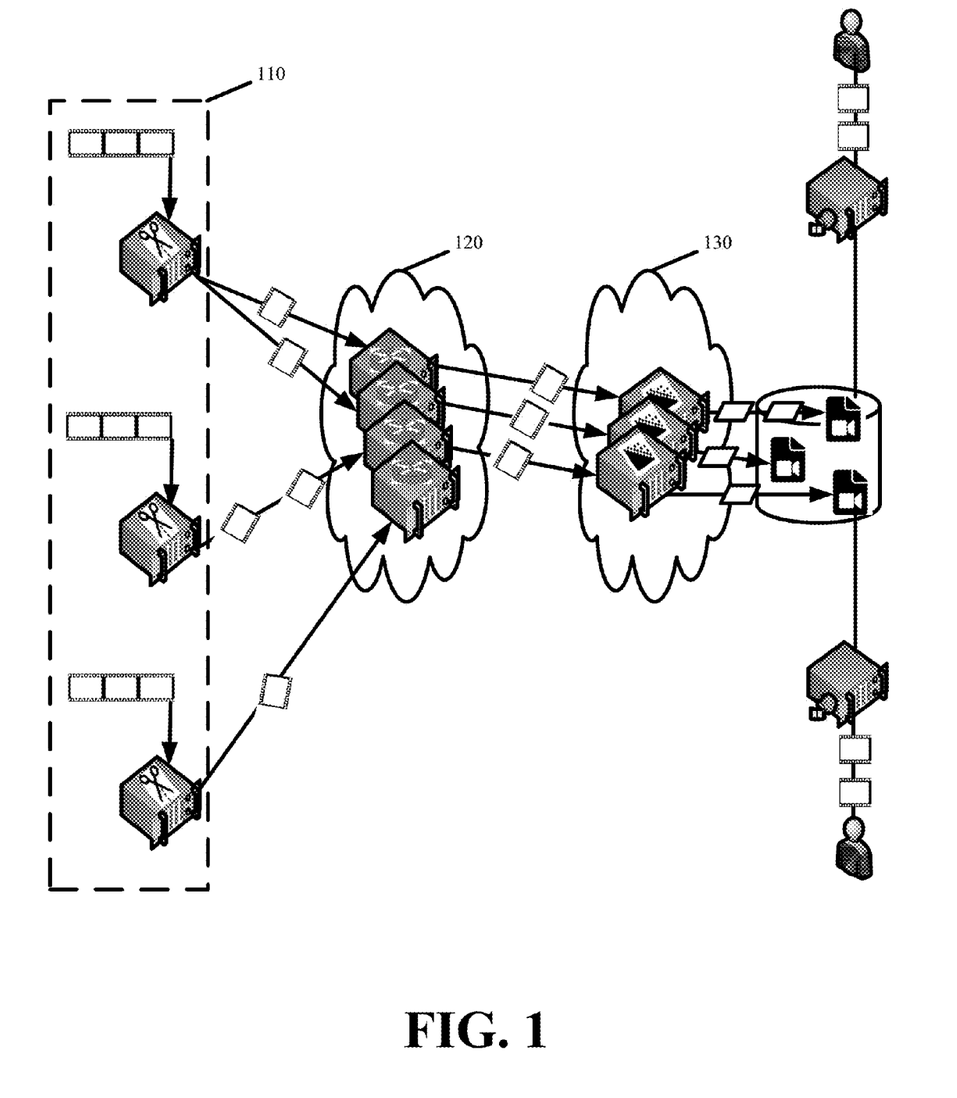
FIG. 1 conceptually illustrates a scalable architecture for decentralized scaling of resources in a media content encoding platform in accordance with some embodiments.

FIG. 1 conceptually illustrates a scalable architecture for decentralized scaling of resources in a media content encoding platform in accordance with some embodiments. The scalable architecture partitions the media encoding platform in at least three tiers. The three tiers include a slicing tier 110, a broker tier 120, and an encoding tier 130.

The slicing tier 110 includes a set of slicers. Each slicer from the set of slicers receives media content from a source (e.g., source file or live feed). The slicer partitions the received media content into a plurality of slices with each slice encompassing a short non-overlapping segment (e.g., five seconds) of the media content. The slicer uploads the slices to the second broker tier 120 of the media encoding platform. In some embodiments, the slicer executes on computing systems near the signal source, such as a computer of the media content provider. The set of slicing resources can also run on a remote machine to which media content providers upload their media content.

The broker tier 120 includes a scalable set of brokers. The set of brokers receives the slices from the slicing tier 110 as the slices are uploaded. The set of brokers fans out the slices across the third encoding tier 130 as different encoding resources within the encoding tier 130 become available.

Some embodiments have optimized the broker tier 120 by moving away from a database implementation. Observations of the media content encoding platform revealed that slices remain in the broker tier 120 for a short period of time before they are removed as a result of encoding. In a database implementation of the broker tier 120, a received slice is written to cloud storage before a separate write is made to a database to indicate availability of the slice to the encoding tier 130. After a brief amount of time in which the slice is encoded, a write is performed to remove the slice from cloud storage and another write removes the database entry created for that slice. Writing slices to cloud storage and then updating database records introduce delays in the platform and create bottleneck potentials if the time taken to perform the writes exceeds the time for retaining the slices at the broker tier. This is especially problematic as the number of concurrent slices increases and the cloud storage or database temporarily buffers some writes to complete write operations for previously received slices.

Preferred embodiments optimize the broker tier 120 by replacing cloud based storage and database management of the slices with brokers that manage slices directly in main memory. In some such embodiments, each broker is a network addressable machine that retains one or more uploaded slices awaiting encoding entirely within main memory without writing the slices to disk. Moreover, the brokers of some embodiments eliminate the need for a database by directly communicating information about slices awaiting encoding with the encoders in the third tier 130.

The encoding tier 130 is formed by a scalable set of encoders. The set of encoders performs a distributed and parallelized encoding of the slices received by the broker tier 120. In some embodiments, the distributed and parallelized encoding uses two or more different encoders to simultaneously encode different slices of the same media content. In some embodiments, the distributed and parallelized encoding uses two or more different encoders to encode the same slice for different formats, streaming protocols, or devices.

In some embodiments, the encoded slices are placed on origin storage of the media content encoding platform. The encoded media content can then be served and distributed in response to different end user requests for the media content from the origin storage. In some embodiments, the media content encoding platform includes another scalable tier of caching servers to facilitate the distribution of the encoded media content.

Figure 2:
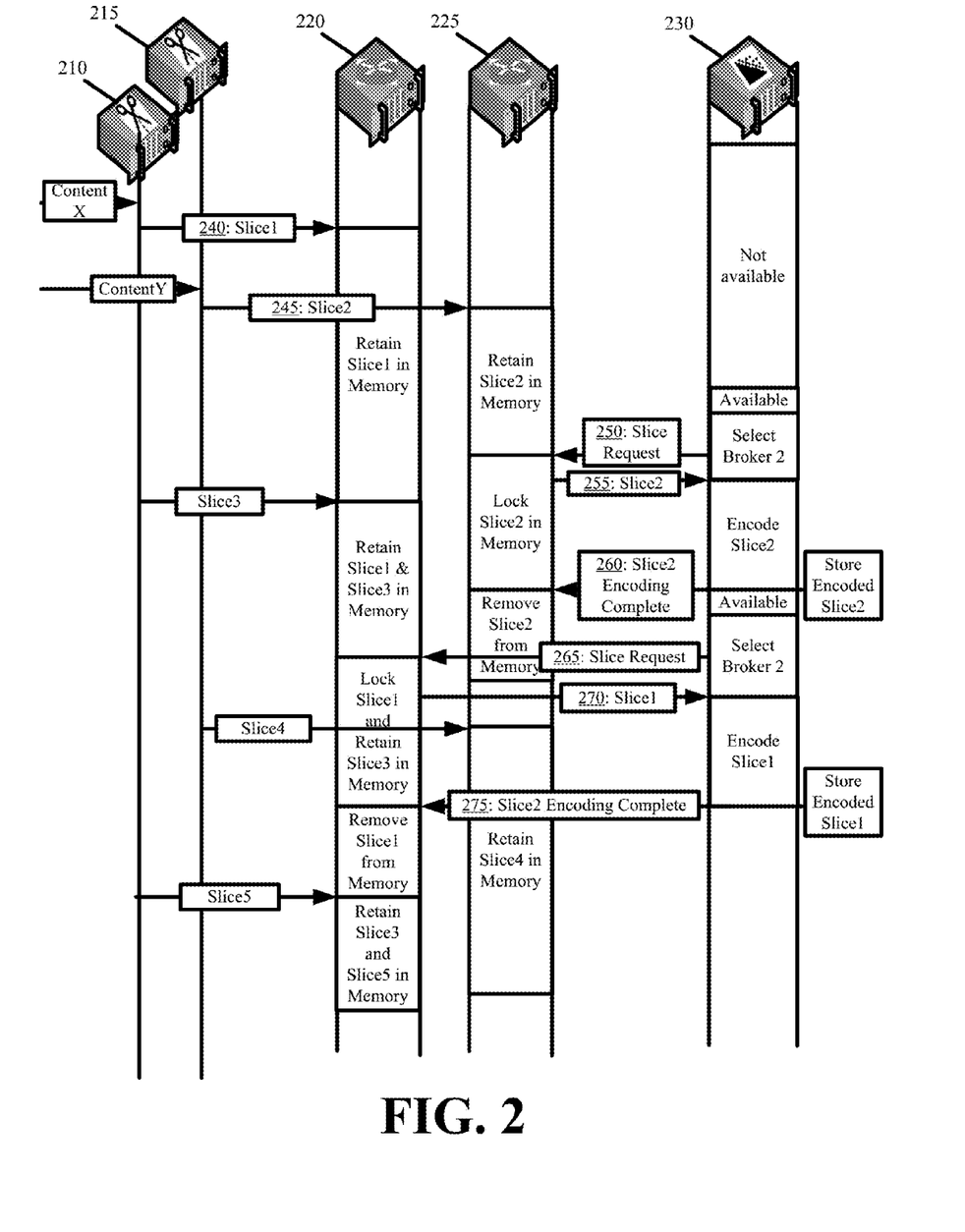
FIG. 2 presents a message exchange diagram illustrating media content encoding with the scalable architecture of some embodiments.

FIG. 2 presents a message exchange diagram illustrating media content encoding with the scalable architecture of some embodiments. The figure illustrates a first slicer 210, a second slicer 215, a first broker 220, a second broker 225, and an encoder 230.

The first slicer 210 receives first media content and the second slicer 215 receives second media content. The first slicer 210 queries a configuration listing the available brokers in the broker tier. The first slicer 210 identifies the first broker 220 and uploads (at 240) a first slice (i.e., a first slice of the first media content) to the first broker 220. The second slicer 215 also queries the configuration broker list to identify the second broker 225 before uploading (at 245) a second slice (i.e., a first slice of the second media content) to the second broker 225. In some embodiments, the second slicer 215 may first attempt to upload the second slice to the first broker 220 before determining that the first broker 220 is unavailable due to the first slice upload by the first slicer 210. In some embodiments, the first slicer 210 selects and uploads slices to the first broker 220 because the first broker 220 is the closest broker in the broker tier to the first slicer 210, and the second slicer 215 selects and uploads slices to the second broker 225 because the second broker 225 is the closest broker in the broker tier to the second slicer 215. In some other embodiments, Domain Name System (DNS) query resolution or other routing schemes, such as Anycast routing, automatically route the first slicer 210 to the first broker 220 and the second slicer 215 to the second broker 225.

The first broker 220 retains the first slice in main memory without performing any writes to disk or a database. The second broker 225 similarly retains the second slice in main memory.

The encoder 230 queries the broker tier for slices awaiting encoding. In some embodiments, the encoder 230 is temporarily assigned to one or more brokers in the broker tier and the encoder 230 queries those one or more brokers that it is assigned to for slices awaiting encoding. In some embodiments, the encoder 230 queries both the first 220 and second 225 brokers in order to identify all slices awaiting encoding and then selects the slice that has been retained in memory for the longest amount of time. Alternatively, the encoder 230 can perform a round-robin querying through the broker tier or from advertisements sent by the brokers to the encoder 230 with the advertisements identifying slices and slice age.

In this figure, the encoder 230 first queries the second broker 225. The query involves sending (at 250) a request for slices the second broker 225 has retained in memory and that are awaiting encoding. The second broker 225 responds to the request by providing the slice that is retained in memory for the longest amount of time. In this case, the second broker 225 sends (at 255) the second slice from main memory to the encoder 230. In some embodiments, the second broker 225 locks the second slice after sending to the encoder 230. The locking of the second slice prevents other encoders (not shown) from also retrieving and encoding the second slice.

The encoder 230 encodes the second slice. The encoder 230 writes the encoded slice to origin storage for subsequent distribution to requesting users. The encoder 230 notifies (at 260) the second broker 225 of the completed encoding.

The second broker 225 removes the second slice from memory in response to the encoder 230 notification. The second broker 225 can use the vacated memory to retain a different slice from any of the slicers 210 or 215 in the slicing tier. In some embodiments, the second broker 225 removes the second slice from memory immediately after sending the slice to the encoder 230 without waiting for the encoder 230 to confirm that the encoding of the slice has completed.

After encoding the second slice, the encoder 230 is once again available. The encoder 230 queries the brokers 220 and 225 again for another slice awaiting encoding. This time the encoder 230 queries (at 265) the first broker 220 and obtains (at 270) the first slice from the first broker 220 in response to the query.

The encoder 230 encodes the first slice, places the encoded slice on origin storage, and notifies (at 275) the first broker 220 that the first slice encoding is complete. In response, the first broker 220 removes the second slice from memory and uses the vacated memory to retain new slices that are uploaded from the slicers 210 or 215 in the slicing tier.

Although two slicers 210 and 215, two brokers 220 and 225, and one encoder 230 are depicted in FIG. 2, the architecture can easily scale any of the tiers to provide additional resources. For instance, the platform could scale the encoding tier to introduce a second encoder in addition to the first encoder 230. The scaling of the encoding tier would allow for the second encoder to retrieve and encode the first slice from the first broker 220 simultaneously or contemporaneously with the first encoder 230 encoding the second slice from the second broker 225.

As an alternative to the encoders pulling slices from the brokers as depicted above in FIG. 2, some embodiments provide a push based implementation. According to the push based implementation, each broker tracks encoder availability. The brokers can collectively track encoder state or independently track encoder state. Upon receiving a new slice from a slicer at a particular broker, the particular broker selects an optimal encoder for encoding that slice based on the tracked availability and distributes the new slice to the optimal encoder, wherein the optimal encoder is an encoder that can encode the new slice with the least amount of delay. If all encoders are busy encoding slices, the particular broker can determine which encoder is expected to have earliest availability and queue the new slice for distribution to the next available encoder.

The scalable architecture presented in FIGS. 1 and 2 decentralizes the slicing, the brokering of the slices, and the encoding in order to allow each tier to scale independent of one another. Moreover, each tier can be scaled vertically and horizontally.

Scaling the broker tier involves adding brokers to the broker tier and changing the configuration that provides the current list of brokers in the broker tier. The addition of brokers vertically scales the broker tier by increasing the total number of nodes for receiving the slices from the slicing tier, which increases the available main memory for managing the slices, which increases the number of concurrent slices that the platform can ingest at one time, which increases the total number of slicers that the platform can concurrently support, which ultimately increases the number of media content providers the platform can simultaneously support. In some embodiments, adding brokers involves deploying or instantiating new or additional machines that are configured to perform slice brokering using memory as set forth herein. The deployment can include reconfiguring or repurposing platform resources that are not currently in use. For example, a machine can first be configured as an encoder for a first duration in which additional encoders are needed in the platform. The same machine can then be reconfigured as a broker for a second duration in which additional encoders are not needed but additional brokers are needed in the platform.

As broker resources are added to or removed from the broker tier, the broker list configuration is updated to provide the other tiers with an up-to-date listing of brokers. In some embodiments, the broker tier configuration is stored to and distributed from a platform back-end service. In some such embodiments, the brokers are configured to update the configuration when they are brought online or taken offline, and the slicers and encoders are configured to access the back-end service in order to obtain an updated configuration. A similar configuration can track the encoders within the encoding tier. In some such embodiments, the brokers access the configuration listing the encoders within the encoding tier when the brokers distribute slices across the encoding tier through a push based implementation or when one or more encoders are temporarily assigned to one or more brokers.

In some embodiments, the back-end service accesses are performed via an application programming interface. In some embodiments, the slicers, brokers, and/or encoders register with the back-end service. The back-end services can then provide updated configurations of brokers within the broker tier to the registered slicers and encoders whenever a change is made to the broker list configuration. The back-end services can also provide updated configurations of encoders within the encoding tier to the registered brokers whenever a change is made to the encoder list configuration.

The configuration facilitates horizontal scaling of the broker tier by providing the slicers with two or more brokers to which slices can be uploaded. The horizontal scaling can be leveraged to facilitate failover, redundancy, or performance improvements in the upload of slices from the slicing tier to the broker tier.

Figure 3:
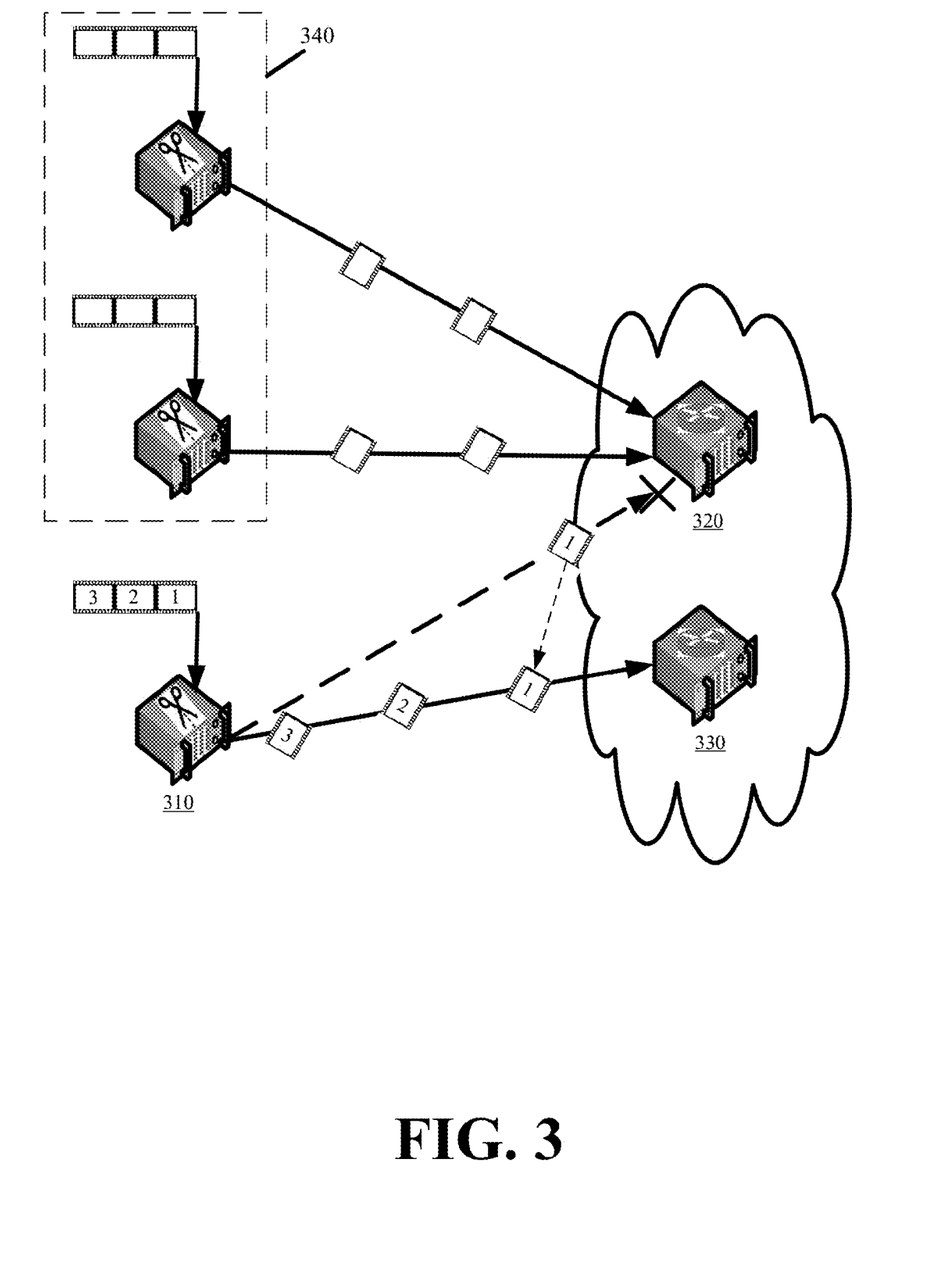
FIG. 3 illustrates leveraging the horizontal scaling of the broker tier for failover in accordance with some embodiments.

FIG. 3 illustrates leveraging the horizontal scaling of the broker tier for failover in accordance with some embodiments. The figure illustrates a particular slicer 310 failing over from a primary broker 320 to a secondary broker 330 in response to the primary broker 320 becoming unavailable or providing poor performance during a slice upload. The primary broker's 320 resources may be utilized receiving slices from a different set of slicers 340. Accordingly, the particular slicer 310 selects the secondary broker 330 so that the slice and other subsequent slices can be uploaded without the particular slicer 310 stopping or delaying the slice upload in order for the primary broker 320 to become available. If the particular slicer 310 had already uploaded one or more slices to the primary broker 320 before the primary broker 320 became unavailable, the particular slicer 310 can switch to the secondary broker 330 and re-upload those slices to the secondary broker 330 or simply switch in order to upload subsequent slices of the same media content to the secondary broker 330.

In some embodiments, the particular slicer selects the primary broker as the broker within the configuration broker list that is most geographically proximate to the particular slicer. The primary broker can also be selected automatically via DNS query resolution or other routing schemes.

Figure 4:
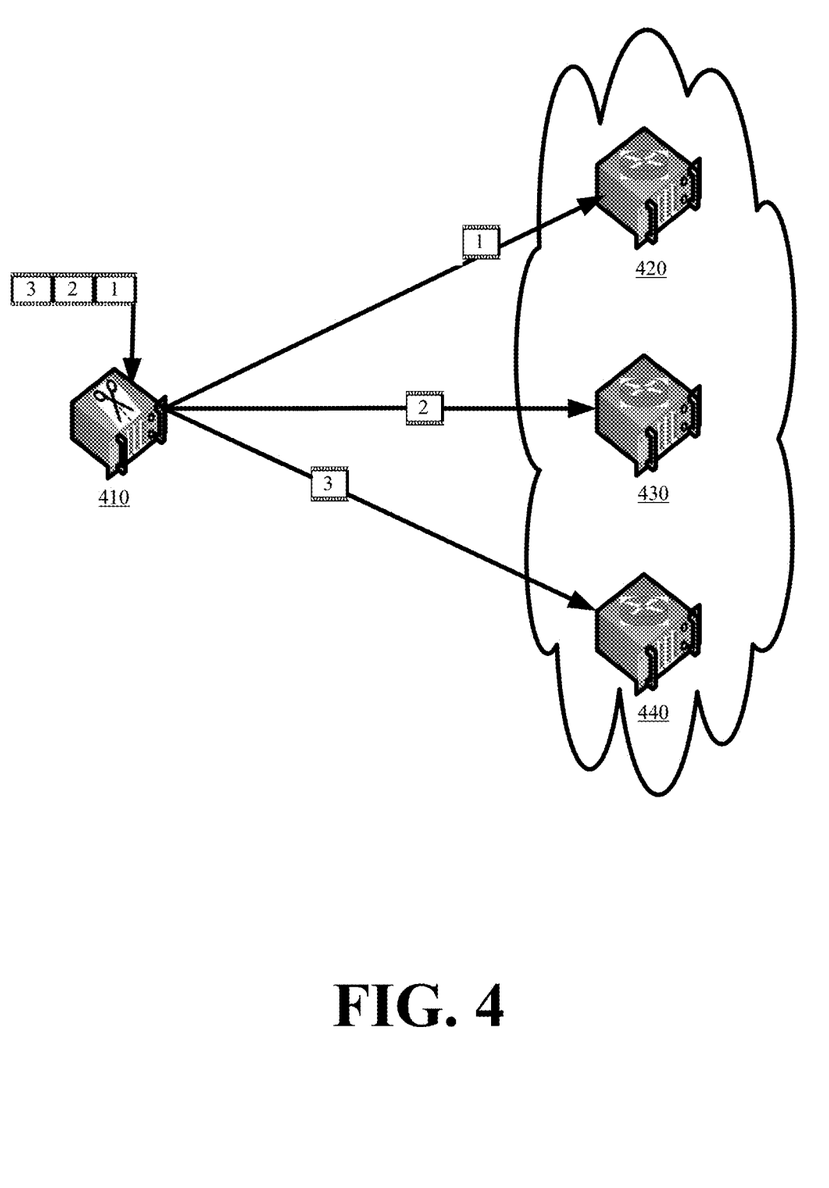
FIG. 4 illustrates leveraging the horizontal scaling of the broker tier for distributed and parallelized slice uploading in accordance with some embodiments.

FIG. 4 illustrates leveraging the horizontal scaling of the broker tier for distributed and parallelized slice uploading in accordance with some embodiments. In this figure, a particular slicer 410 uploads different slices of the same media content to different brokers 420, 430, and 440.

The distributed uploading of slices provides redundancy so that the failure of any one broker 420, 430, or 440 does not make all slices unavailable. The uploading of the different slices can also be done in parallel, whereby the particular slicer 410 uploads a first slice of particular media content to a first broker while simultaneously uploading a second slice of the particular media content to a different second broker. In some other embodiments, the particular slicer 410 can upload a first slice of first media content to a first broker while simultaneously uploading a first slice of different second media content to a different second broker if two different media content are uploaded through the same particular slicer.

The scaling of the encoding tier occurs independent of the broker tier scaling. Scaling the encoding tier reduces the amount of time any given slice is buffered and can be used to ensure that the platform provides real-time encoding of media content. The vertical scaling of the encoding tier increases the number of encoders, thereby increasing the total number of slices that the platform can concurrently encode. The horizontal scaling of the encoding tier involves allocating multiple encoders to encode different slices of the same media content. In other words, the horizontal scaling enables the parallelized encoding of media content within the encoding platform.

In some embodiments, scaling the encoding tier involves temporarily assigning available encoders from a pool of unassigned encoders to one or more brokers. The encoders can be assigned to different brokers in response to broker utilization exceeding one or more thresholds or other triggers. Similarly, the encoders can be released from the different brokers and entered back into the pool of unassigned encoders in response to broker utilization falling below one or more threshold or other triggers. The released encoders can then be reassigned to other brokers in order to scale the encoding tier for the other brokers.

In some embodiments, scaling the encoding tier involves adding encoders to the pool of unassigned encoders. In some such embodiments, adding encoders includes deploying or instantiating new or additional machines or cloud instances that are configured to encode slices as set forth herein. The encoders can be hardware based whereby application-specific integrated circuits (ASICs) or other special purpose processors are used to perform the encoding. The deployment of encoders can also include reconfiguring or repurposing platform resources that are not currently in use. In this case, a machine that is configured as a broker for a first duration in which additional brokers are needed in the platform, can be reconfigured as an encoder for a second duration in which additional brokers are not needed but additional encoders are needed in the platform.

The platform also performs an inverse scaling of resources when usage falls below the configured thresholds. In such cases, the platform scales down the allocated resources by removing one or more brokers and encoders. In some embodiments, scaling down resources involves decommissioning excess resources or reentering the excess resources in a pool of available resources. In some other embodiments, scaling down resources involves reconfiguring or repurposing the resources for different functionality. As noted above, some embodiments allow the same machine to be reconfigured as a broker or encoder depending on platform needs. In some embodiments, the machine that can be configured as a broker or encoder can also be reconfigured to operate as a caching server delivering encoded content to requesting users.

Scaling of the broker tier or encoding tier can be triggered from within the tiers or from an external monitor. Brokers can trigger scaling within the broker tier or within the encoding tier. Similarly, encoders can trigger scaling within the encoding tier or within the broker tier. Moreover, monitors may be deployed within the media content encoding platform to monitor utilization or performance of the broker tier and the encoding tier and to scale the tiers based on the monitoring results.

The scaling of the broker tier and encoding tier primarily occurs in response to customer demand. Customer demand is based on the number and rate with which slices are uploaded from the slicing tier to the broker tier. The uploaded slices can affect any of several factors that control the scaling of the broker tier and/or encoding tier. The figures below illustrate scaling in response to customer demand as determined from throughout of data, broker memory utilization, and slice retention time. It should be noted that other factors can be used to scale the different tiers. Additionally, different factors can be used to determine when to instantiate additional encoder instances in the pool of available encoders. For instance, the assignment of encoders from the pool of unassigned encoders to the brokers can be based on broker utilization and the instantiation of additional encoders in the pool of unassigned encoders can be based on several metrics including the ratio of assigned to unassigned encoders. Some embodiments further perform predictive scaling whereby resources of a given tier are preemptively increased or decreased based on past or expected demand.

Figure 5:
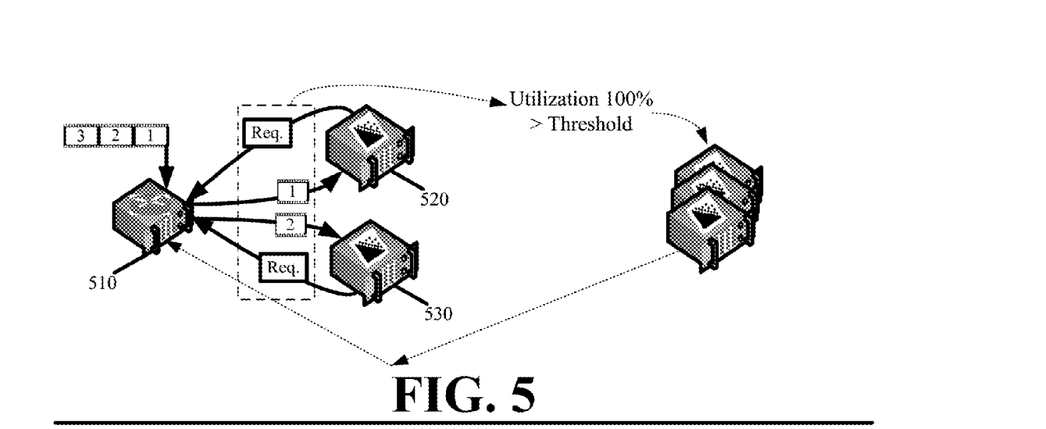
FIGS. 5-7 illustrate scaling by increasing and decreasing the number of encoders assigned to a particular broker based on a throughput of data.
Figure 6:
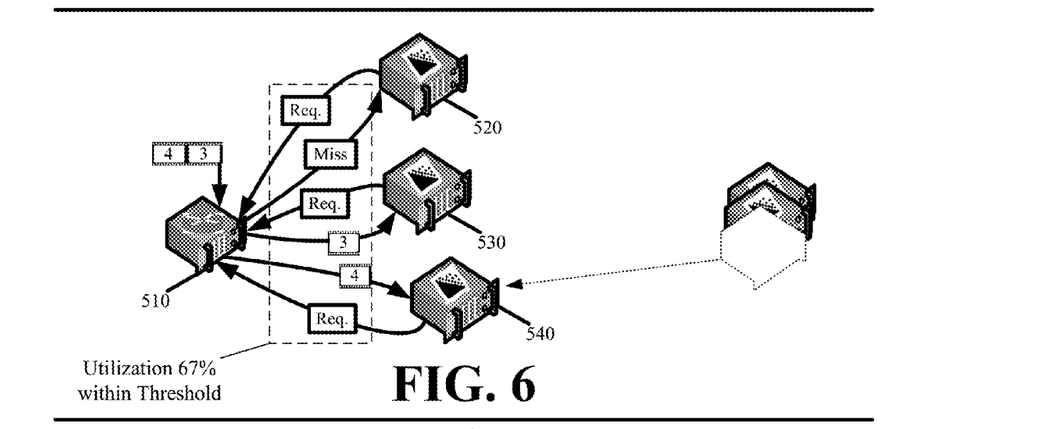
Figure 7:
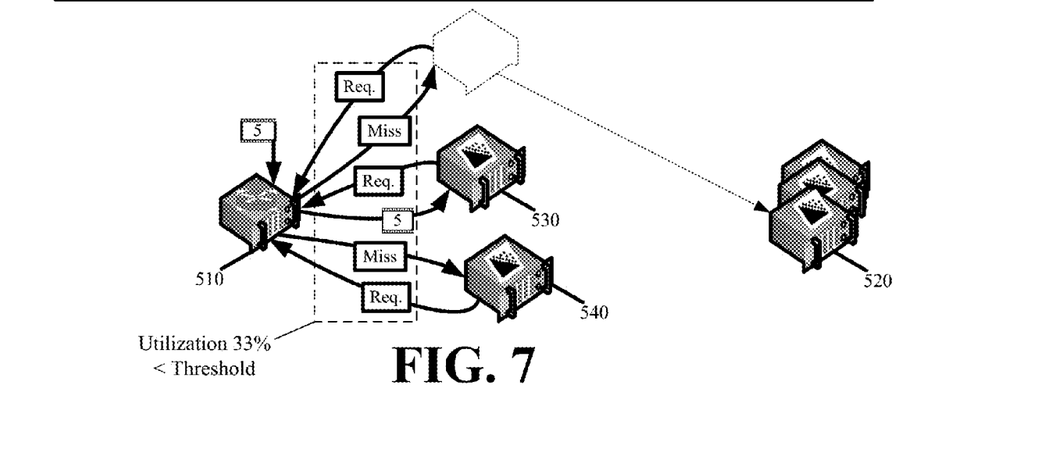

FIGS. 5-7 illustrate scaling by increasing and decreasing the number of encoders assigned to a particular broker 510 based on a throughput of data. FIG. 5 conceptually illustrates a particular broker 510 initially assigned with two encoders 520 and 530. The particular broker 510 tracks requests or queries for slices awaiting encoding from the two assigned encoders 520 and 530. Each time the particular broker 510 provides a slice in response to a request, the request is categorized as a hit. If the particular broker 510 has no slices to provide in response to an encoder request, the request is categorized as a miss. The encoder can then retry the request after a retry interval. The particular broker 510 determines its utilization based in part on the encoder submitted request hits and misses. FIG. 5 further illustrates assigning a third encoder 540 to the particular broker 510 after utilization tracked from a trailing number of encoder requests exceeds a first threshold. In some embodiments, the first threshold for increasing the number of encoders assigned to the particular 510 broker is derived from a hysteresis value added to a specified utilization percentage. For example, scaling may be triggered at 65% utilization with a +/−10% hysteresis value to avoid assigning and releasing encoders due to small fluctuations of the utilization.

FIG. 6 illustrates the particular broker 510 distributing slices in response to requests from the three encoders 520, 530, and 540. FIG. 6 further illustrates utilization of the particular broker 510 by the three encoders 520, 530, and 540 creating excess capacity that is within acceptable thresholds.

FIG. 7 then illustrates releasing the first encoder 520 of the three encoders 520, 530, and 540 assigned to the particular broker 510 after utilization tracked from a subsequent trailing number of encoder requests falls below a second threshold. In some embodiments, the second threshold for decreasing the number of encoders assigned to the particular broker 510 is derived from subtracting the hysteresis value from the particular utilization percentage.

Figure 8:
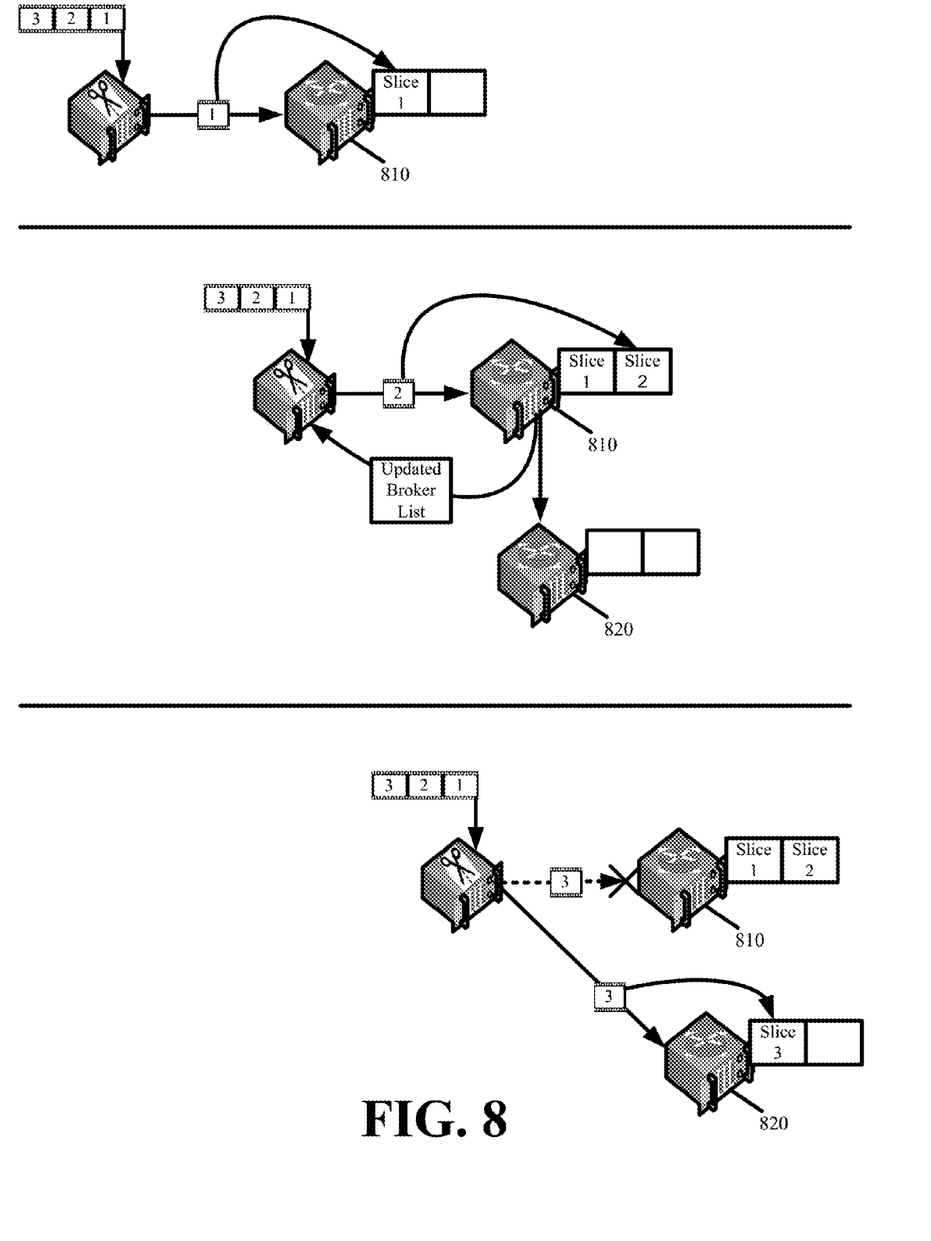
FIG. 8 illustrates a particular broker within the broker tier triggering scaling in response to memory usage of the particular broker exceeding a threshold.

FIG. 8 illustrates a particular broker 810 within the broker tier triggering scaling in response to memory usage of the particular broker 810 exceeding a threshold. In this figure, the scaling is performed in the broker tier. Specifically, one or more additional brokers 820 are brought online in order to receive new slices being uploaded from the slicing tier. An updated broker list configuration is passed to the slicers in the slicing tier once the additional brokers 820 are brought online.

Although not shown, the particular broker 810 could additionally or alternatively scale the encoding tier, whereby scaling the encoding tier adds encoding resources to accelerate the encoding of slices from broker memory, thereby expediting the removal of the slices from broker memory. In other words, rather than scale the broker tier to keep more slices in memory, the scaling can occur in the encoding tier so that the slices stay in the broker tier for less time, thereby reducing the amount of memory needed at the broker tier.

Figure 9:
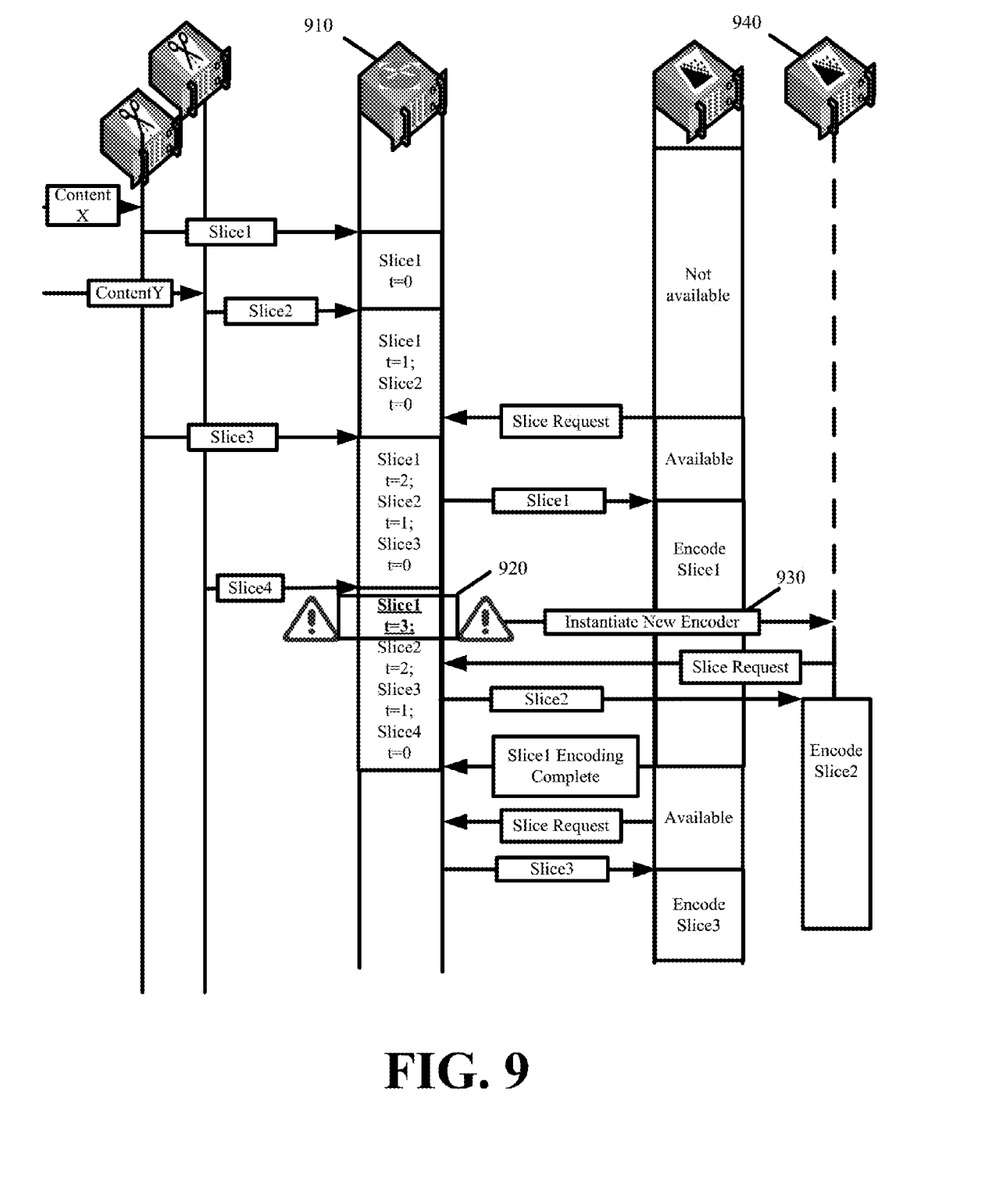
FIG. 9 illustrates a particular broker triggering scaling within the encoding tier in response to one or more slices remaining in broker memory for more than a threshold time.

FIG. 9 illustrates a particular broker 910 triggering scaling within the encoding tier in response to one or more slices remaining in broker memory for more than a threshold time. As shown, the particular broker 910 sets a timer for every slice that is received in memory. The timer triggers the scaling if it expires before the slice is encoded and removed from memory.

The timer set for the second received slice expires (at 920). Accordingly, the particular broker 910 triggers scaling (at 930) within the encoding tier such that an additional encoder 940 is assigned to accelerate the encoding and expedite the removal of the slices from the particular broker's 910 memory. It should be noted that encoders within the encoding tier could also identify the amount of time slices are retained at the broker tier and trigger scaling of the encoding tier.

Figure 10:
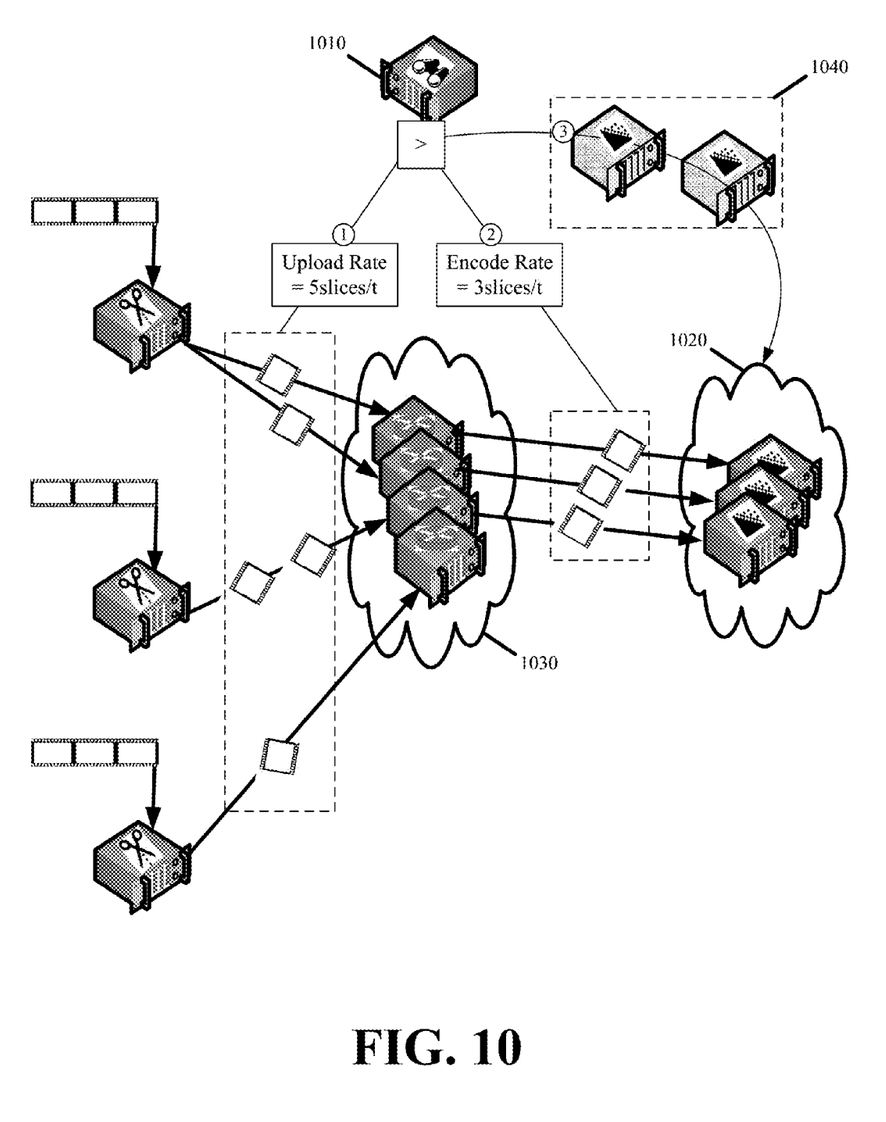
FIG. 10 illustrates an external monitor triggering scaling as a result of the encoding tier failing to encode slices faster than the broker tier receives slices from the slicing tier.

FIG. 10 illustrates an external monitor 1010 triggering scaling as a result of the encoding tier 1020 failing to encode slices faster than the broker tier 1030 receives slices from the slicing tier. In this figure, the external monitor 1010 monitors the addition and removal rate of slices. The addition rate is based on the number of slices the slicing tier uploads to the broker tier 1030 over an interval. In this figure, the upload rate is five slices per time interval. The removal rate is based on the number of slices the encoding tier 1020 encodes over the same interval. In this figure, the encoding rate is three slices per time interval. Since the upload rate is greater than the encoding rate, the external monitor 1010 scales the encoding tier 1020 by deploying (at 1040) two additional encodes to the encoding tier 1020.

Figure 11:
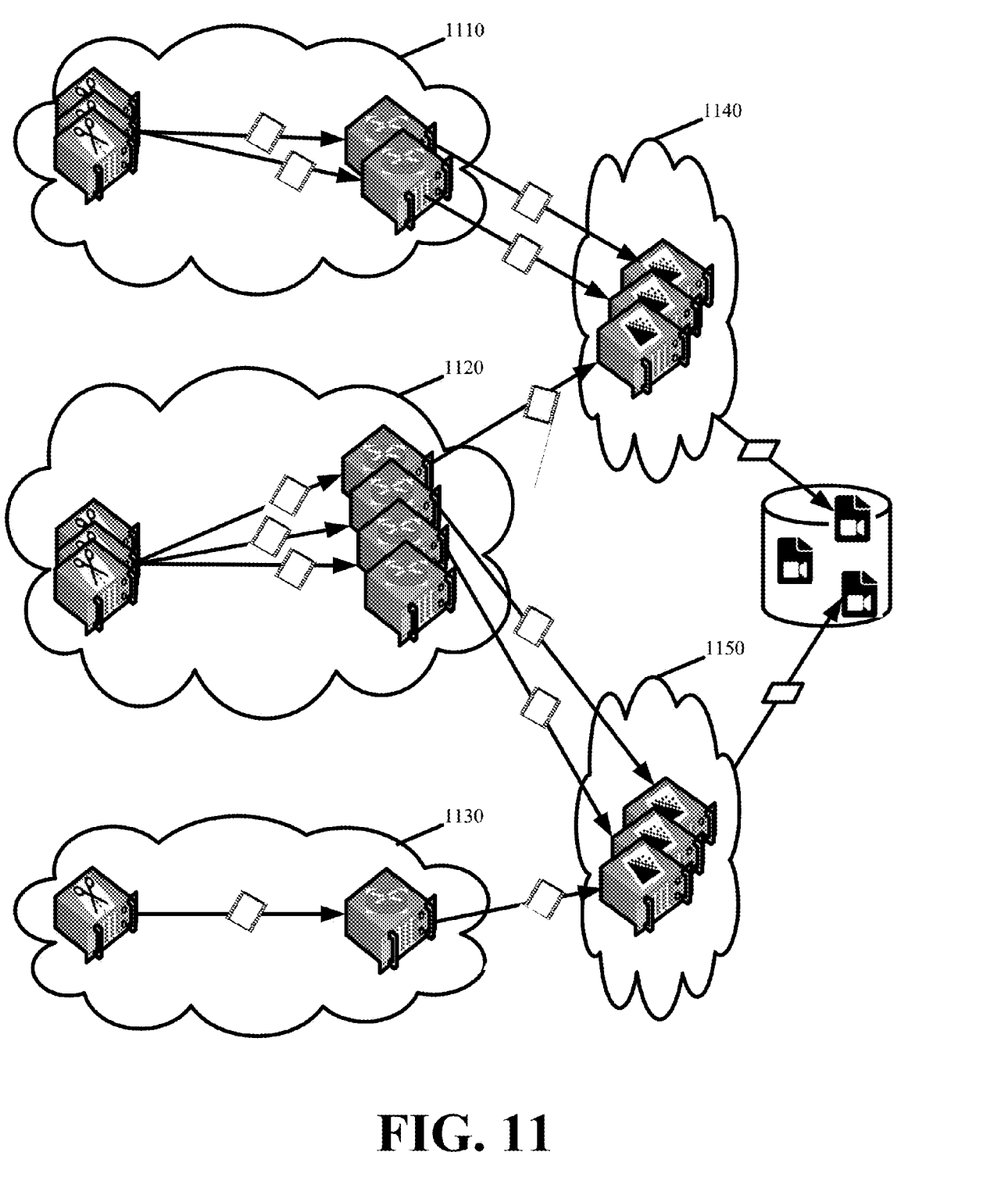
FIG. 11 illustrates subdividing the broker tier and the encoding tier of the media content encoding platform for localized scaling in accordance with some embodiments.

In some embodiments, the broker tier and encoding tier of the media content encoding platform are subdivided into geographical sub-tiers to allow for a more localized scaling of resources. FIG. 11 illustrates subdividing the broker tier and the encoding tier of the media content encoding platform for localized scaling in accordance with some embodiments.

In this figure, the broker tier is formed from three different broker sub-tiers 1110, 1120, and 1130 and the encoding tier is formed from two different encoding sub-tiers 1140 and 1150. Each of the sub-tiers 1110, 1120, 1130, 1140, and 1150 is configured to perform slice brokering or encoding for one or more different geographic regions.

The first broker sub-tier 1110 is geographically proximate to the first set of slicers and is the optimal sub-tier for receiving slices uploaded by the first set of slicers. The second broker sub-tier 1120 is geographically proximate to the second set of slicers and is the optimal sub-tier for receiving slices uploaded by the second set of slicers. The third broker sub-tier 1130 is geographically proximate to the third set of slicers and is the optimal sub-tier for receiving slices uploaded by the third set of slicers.

In similar fashion, the first encoder sub-tier 1140 provides optimal encoding performance for the first and second broker sub-tiers 1110 and 1120 because of its geographic proximity to those broker sub-tiers 1110 and 1120. The second encoder sub-tier 1150 provides optimal encoding performance for the second and third broker sub-tiers 1120 and 1130 because of its geographic proximity to those broker sub-tiers 1120 and 1130.

Should the first broker sub-tier 1110 experience excess demand, the platform can scale additional broker resources in that specific sub-tier rather than have slicers within the corresponding geographic region upload their slices to the more distant second or third broker sub-tiers 1120 and 1130. Similarly, should either encoding sub-tier 1140 or 1150 experience excess demand, the resources within the specific sub-tier can be scaled, thereby maximizing performance of the overall platform.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 12:
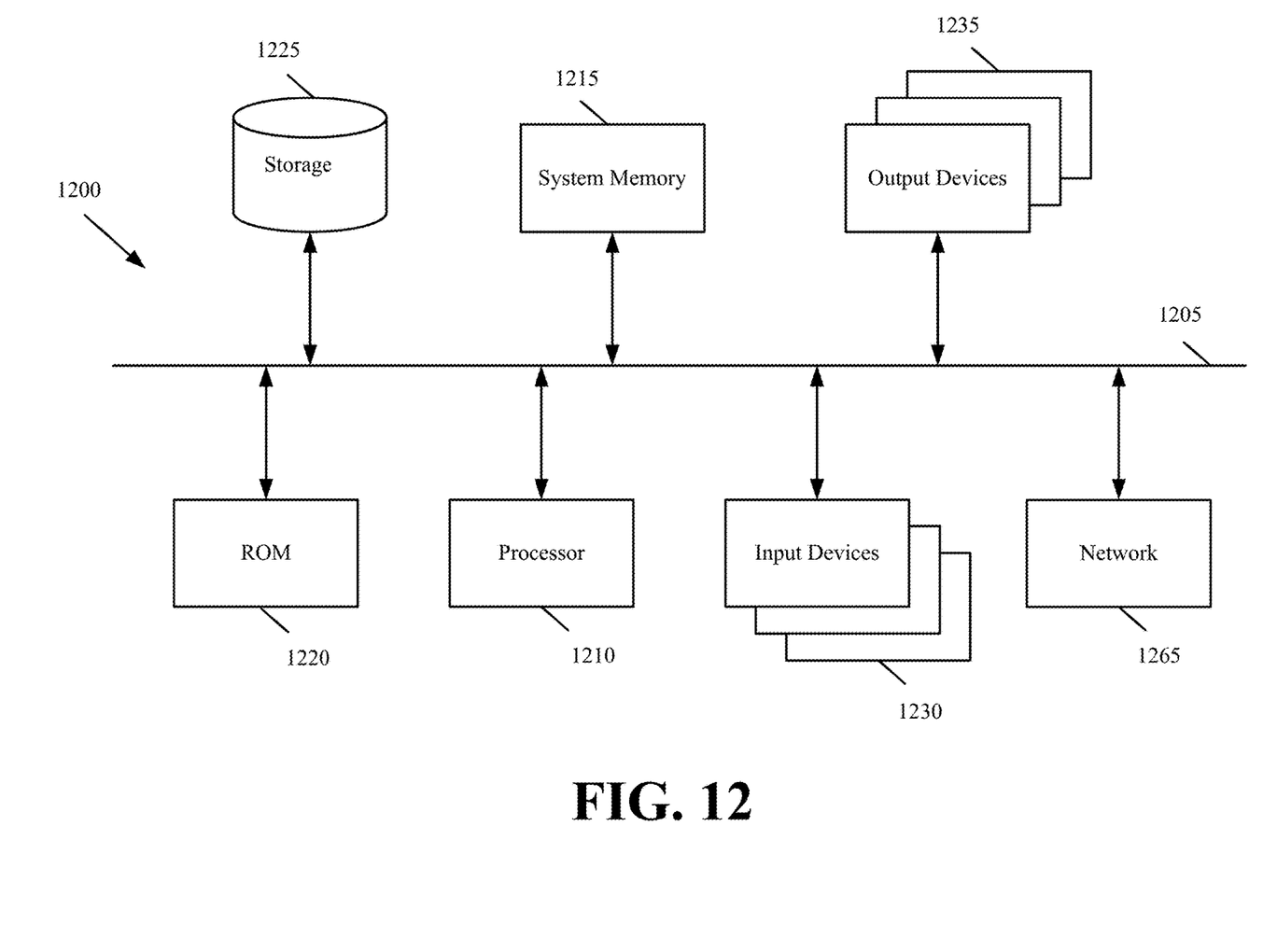
FIG. 12 illustrates a computer system or server with which some embodiments are implemented.

FIG. 12 illustrates a computer system or server with which some embodiments are implemented. Such a computer system includes various types of computer-readable mediums and interfaces for various other types of computer-readable mediums that implement the various methods and machines described above (e.g., slicer, broker, and encoder). Computer system 1200 includes a bus 1205, a processor 1210, a system memory 1215, a read-only memory 1220, a permanent storage device 1225, input devices 1230, and output devices 1235.

The bus 1205 collectively represents all system, peripheral, and chipset buses that communicatively connect the numerous internal devices of the computer system 1200. For instance, the bus 1205 communicatively connects the processor 1210 with the read-only memory 1220, the system memory 1215, and the permanent storage device 1225. From these various memory units, the processor 1210 retrieves instructions to execute and data to process in order to execute the processes of the invention. The processor 1210 is a processing device such as a central processing unit, integrated circuit, graphical processing unit, etc.

The read-only-memory (ROM) 1220 stores static data and instructions that are needed by the processor 1210 and other modules of the computer system. The permanent storage device 1225, on the other hand, is a read-and-write memory device. This device is a non-volatile memory unit that stores instructions and data even when the computer system 1200 is off. Some embodiments use a mass-storage device (such as a magnetic, solid-state, or optical disk) as the permanent storage device 1225.

Other embodiments use a removable storage device (such as a flash drive) as the permanent storage device Like the permanent storage device 1225, the system memory 1215 is a read-and-write memory device. However, unlike storage device 1225, the system memory is a volatile read-and-write memory, such as random access memory (RAM). The system memory stores some of the instructions and data that the processor needs at runtime. In some embodiments, the processes are stored in the system memory 1215, the permanent storage device 1225, and/or the read-only memory 1220.

The bus 1205 also connects to the input and output devices 1230 and 1235. The input devices enable the user to communicate information and select commands to the computer system. The input devices 1230 include alphanumeric keypads (including physical keyboards and touchscreen keyboards), pointing devices. The input devices 1230 also include audio input devices (e.g., microphones, MIDI musical instruments, etc.). The output devices 1235 display images generated by the computer system. The output devices include printers and display devices, such as cathode ray tubes (CRT) or liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 1200 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   receiving a plurality of slices at a first set of brokers, wherein each slice of the plurality of slices comprises a different segment of at least one media content;
   queuing the plurality of slices in memory of the first set of brokers without writing the plurality of slices to disk;
   encoding a first set of the plurality of slices with a first set of encoders;
   determining a first rate corresponding to a rate of receiving the plurality of slices at the first set of brokers, and a second rate corresponding to a rate of encoding the plurality of slices with the first set of encoders based on said encoding;
   scaling from the first set of encoders to a larger second set of encoders in response to the first rate of receiving the plurality of slices being greater than the second rate of encoding the plurality of slices;
   encoding a second set of the plurality of slices with the second set of encoders; and
   determining a third rate that corresponds to a rate of encoding the plurality of slices with the second set of encoders based on said encoding the second set of slices, and wherein the third rate is greater than the first rate or the second rate.

2. The method of claim 1, wherein said scaling from the first set of brokers comprises adding at least one broker to the first set of brokers, the at least one broker comprising additional memory that is used in retaining a subset of the plurality of slices.

3. The method of claim 1 further comprising removing the first set of slices from memory of the first set of brokers in response to encoding the first set of slices.

4. The method of claim 1 further comprising assigning a first subset of the first set of encoders to a first broker of the first set of brokers and a different second subset of the second set of encoders to a second broker of the first set of brokers.

5. The method of claim 4, wherein encoding the first set of slices comprises each encoder of the first subset of encoders encoding slices retained in memory of the first broker and each encoder of the second subset of encoders encoding slices retained in memory of the second broker.

6. A method comprising:
   configuring a first set of a plurality of machines as a first set of brokers;
   receiving a plurality of slices directly into memory of the first set of brokers without writing the plurality of slices to storage or a database, wherein each slice of the plurality of slices comprises a different segment of at least one media content;
   configuring a second set of the plurality of machines as a first set of encoders;
   passing a first set of the plurality of slices from the first set of brokers to the first set of encoders based on messaging exchanged between the first set of brokers and the first set of encoders;
   encoding the first set of slices with the first set of encoders while retaining a second set of the plurality of slices in memory of the first set of brokers; and
   scaling from the first set of brokers and the first set of encoders to a second set of brokers and a second set of encoders by reconfiguring at least one machine from operating as a broker in the first set of brokers to operating as an encoder in the second set of encoders, or by reconfiguring at least one machine from operating as an encoder in the first set of encoders to operating as a broker in the second set of brokers.

7. The method of claim 6, further comprising passing a first slice from the second set of slices to a first encoder of the first set of encoders after the first encoder completes encoding of a slice from the first set of slices.

8. The method of claim 6 further comprising removing the first set of slices from said memory of the first set of brokers in response to said encoding.

9. A system comprising:
   a plurality of machines comprising:
      a first set of the plurality of machines configured as a first set of brokers, the first set of brokers receiving a plurality of slices directly into memory of the first set of brokers without writing the plurality of slices to storage or a database, wherein each slice of the plurality of slices comprises a different segment of at least one media content;
      a second set of the plurality of machines configured as a first set of encoders, the first set of encoders (i) receiving a first set of the plurality of slices from the first set of brokers based on messaging exchanged between the first set of brokers and the first set of encoders, and (ii) encoding the first set of slices with the first set of encoders while retaining a second set of the plurality of slices in memory of the first set of brokers; and
   a device comprising:
      a non-transitory computer-readable medium storing a set of processor-executable instructions; and
      one or more processors configured to execute the set of processor-executable instructions, wherein executing the set of processor-executable instructions causes the one or more processors to:
         scale from the first set of brokers and the first set of encoders to a second set of brokers and a second set of encoders by reconfiguring at least one machine from operating as a broker in the first set of brokers to operating as an encoder in the second set of encoders, or by reconfiguring at least one machine from operating as an encoder in the first set of encoders to operating as a broker in the second set of brokers.

* * * * *